United States Patent
Muller (10) Patent No.: US 9,563,062 B2
(45) Date of Patent: Feb. 7, 2017

(54) SWITCHABLE LENTICULAR ARRAY FOR AUTOSTEREOSCOPIC VIDEO DISPLAY

(71) Applicant: SoliDDD Corp., Brooklyn, NY (US)

(72) Inventor: Richard A. Muller, Berkeley, CA (US)

(73) Assignee: SOLIDDD CORP., Brooklyn, NY (US)

(*) Notice: Subject to any disclaimer, the term of this patent is extended or adjusted under 35 U.S.C. 154(b) by 79 days.

(21) Appl. No.: 14/018,187

(22) Filed: Sep. 4, 2013

(65) Prior Publication Data
US 2014/0071538 A1 Mar. 13, 2014

Related U.S. Application Data

(60) Provisional application No. 61/696,718, filed on Sep. 4, 2012.

(51) Int. Cl.
G02B 27/22 (2006.01)
G02B 3/00 (2006.01)
H04N 13/04 (2006.01)

(52) U.S. Cl.
CPC ........... G02B 27/2214 (2013.01); G02B 3/005 (2013.01); H04N 13/042 (2013.01); H04N 13/0404 (2013.01); H04N 13/0452 (2013.01)

(58) Field of Classification Search
CPC ... G02B 5/045; G02B 5/0053; G02B 27/2214; G02B 27/22; G02B 6/0053
USPC ................... 359/819, 618–628, 458
See application file for complete search history.

(56) References Cited

U.S. PATENT DOCUMENTS 8,045,270 B2 * 10/2011 Shin et al. ................. 359/619
8,054,329 B2 * 11/2011 Shestak .............. G02B 27/2214
348/51
8,754,829 B2 * 6/2014 Lapstun ............. H04N 13/0402
345/419
2009/0244270 A1 10/2009 Takagi et al.
2012/0092339 A1 * 4/2012 Pijlman et al. ............... 345/419

FOREIGN PATENT DOCUMENTS

WO 2006021242 A1 3/2006
WO 2009044334 A1 4/2009

OTHER PUBLICATIONS

International Search Report for Application PCT/US2013/058060, Dec. 18, 2013, 2 pages, European Patent Office, The Hague, Netherlands.

* cited by examiner

*Primary Examiner* — Scott J Sugarman
*Assistant Examiner* — Kristina Deherrera
(74) *Attorney, Agent, or Firm* — Ference & Associates LLC (57) ABSTRACT

Lenticles of a lenticular array can be electronically controlled to be optically equivalent to either of two sets of virtual lenticles having two distinct physical characteristics. Each of the lenticles is in sufficiently close proximity to one or more switchable prisms to optically combine with therewith. The switchable optical elements can be switchable columnar prisms for example. In a first state, the switchable prisms optically combine with the lenticles such that the combination is optically equivalent to a first set of virtual lenticles. In a second, different state, the switchable prisms optically combine with the lenticles such that the combination is optically equivalent to a second, different set of virtual lenticles. Accordingly, the lenticular array can switch between two distinct configurations with the flip of a switch.

9 Claims, 6 Drawing Sheets

SWITCHABLE LENTICULAR ARRAY FOR AUTOSTEREOSCOPIC VIDEO DISPLAY

CROSS-REFERENCE TO RELATED APPLICATIONS

This application claims priority of U.S. Provisional Patent Application Ser. No. 61/696,718 filed Sep. 4, 2012 entitled "Autostereoscopic Video Display" by Neal Weinstock and Richard A. Muller.

FIELD OF THE INVENTION

The present invention relates generally to autostereoscopic displays, and, more particularly, to a lenticular array that can be switched between two different configurations.

BACKGROUND OF THE INVENTION

Conventional autostereoscopic displays use arrays of lenses or parallax barriers or other view selectors to make a number of pixels of the display visible to one eye of a viewing person and to make a number of other pixels of the display visible to the other eye of the viewing person. By isolating the pixels of the display visible to each eye, the two components of a stereoscopic image can be presented on the display.

Since an ordinary viewer's eyes are side-by-side and aligned horizontally, the array of lenses makes pixels visible according to horizontal orientation. As a result, corresponding pixels for the left and right eyes are located in the same scanline and displaced from one another horizontally.

Each eye of the viewer therefore sees an image whose horizontal resolution is halved in an autostereoscopic displays having only two views. In most autostereoscopic displays, field of view is improved by having more than just two views. In attempts to provide greater perceived depths of projection, many more views—e.g., 24 views—are required. A typical LCD display screen has a pixel density of about 200 pixels per inch, though some have densities approaching 300 pixels per inch or more. That's approximately 6 pixels per millimeter, i.e., sufficient resolution to provide 24 views in a 4 mm space.

For some stereoscopic video content, perceived pixels that are 4 mm wide might be adequate. However, not all video content is the same. For some stereoscopic video content, it may be preferred to have fewer views but to have finer horizontal display resolution. In particular, if the display is to also sometimes display video content that is not stereoscopic, it would be preferable that the lenticular array not group views in groups that are 24 pixels and 4 mm wide but instead provide full horizontal resolution or as near to full horizontal resolution as possible.

In conventional autostereoscopic displays, such reconfiguration is only achievable, if at all, by physical removal of the lenticular array and perhaps replacement with a different lenticular array.

SUMMARY OF THE INVENTION

In accordance with the present invention, lenticles—i.e., columnar lenses—of a lenticular array can be electronically controlled to be optically equivalent to either of two sets of virtual lenticles having two distinct physical characteristics. Each of the lenticles is in sufficiently close proximity to one or more switchable optical elements to optically combine with the switchable optical elements. The switchable optical elements can be switchable columnar prisms for example.

In a first state, the switchable prisms optically combine with the lenticles such that the combination is optically equivalent to a first set of virtual lenticles. For example, the switchable prisms in the first state can have a refraction index substantially equivalent to the refraction index of a surrounding material such that the switchable prisms essentially have no optical effect. In such a case, the first set of virtual lenticles would be optically equivalent to the lenticles of the lenticular array alone.

In a second, different state, the switchable prisms optically combine with the lenticles such that the combination is optically equivalent to a second, different set of virtual lenticles. For example, the switchable prisms in the second state can have a refraction index substantially equivalent to the refraction index of the lenticles such that the optical combination of the switchable prisms with the lenticles is significantly different, optically speaking, than the lenticles alone. Each of the switchable prisms combine with only a part of the lenticle such that the remainder of the lenticle does not combine optically with the switchable prism. The remainder can optically combine with another switchable prism that deflects light at a significantly different angle in the second state or no switchable prism at all. The result is that the part of the lenticle that combines optically with a switchable prism is optically different in a significant way from the remainder of the lenticle that does not optically combine with the switchable prism. In effect, the prism is split into two virtual prisms. Additional switchable prisms can be used with a lenticle to effectively split the lenticle into three or more virtual lenticles.

Using birefringent material for the switchable optical elements, the refraction index—and therefore the state—of the switchable optical elements can be controlled electrically. Accordingly, the lenticular array can switch between two distinct configurations with the flip of a switch.

DETAILED DESCRIPTION OF THE INVENTION

Figure 3:
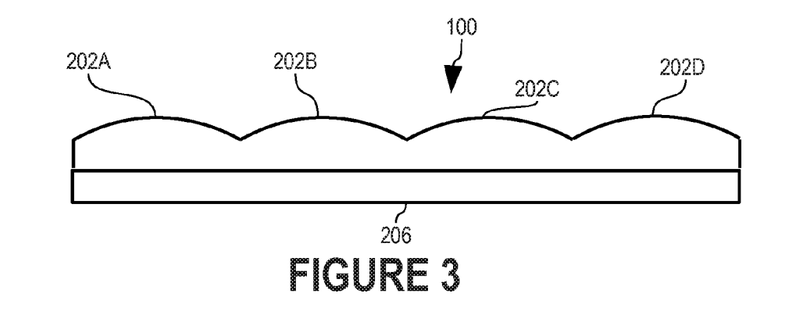
FIGS. 3-5 are plan views of the lenticular array that illustrate how the lenticular array is switchable between two alternative configurations in accordance with the present invention.
Figure 5:
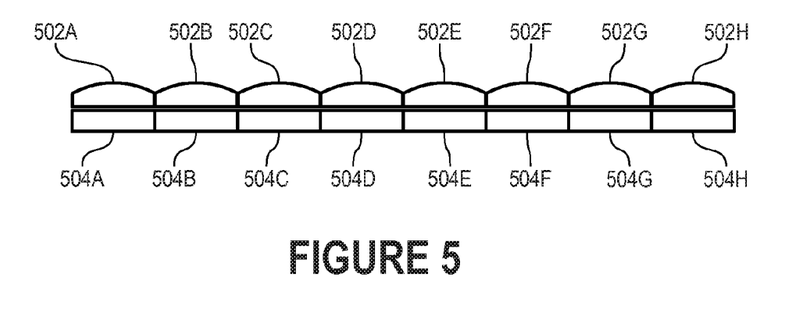

In accordance with the present invention, lenticles 202A-D (FIG. 3) of a lenticular array 100 can be electronically controlled to act optically as shown in FIG. 3 or to act optically as shown by lenticles 502A-H (FIG. 5). Lenticular array 100 (FIG. 1) presents an autostereoscopic view to a human viewer 10 and the view has a perceived width 120 and a perceived depth 130.

Lenticular array 100 (FIGS. 1-3) includes switchable prisms 204A-H (FIG. 2) that can be switched between a state in which lenticles 202A-D optically behave in one way and a second state in which lenticles 202A-D optically behave in a second, different way. As described more completely below in conjunction with FIG. 8, switchable prisms 204A-H are made of birefringent material such as liquid crystal and can be electronically switched between two different refraction indices. In this illustrative embodiment, one of the refraction indices is that of lenticles 202A-D and the other is that of transparent layer 206 in which switchable prisms 204A-H are formed. In addition, switchable prisms 204A-H have a right triangle cross section in which angle 208 is 16 degrees in this illustrative embodiment. Switchable prisms 204A-H can also be designed as Fresnel type prisms.

In an "off" state in which switchable prisms 204A-H have no optical effect, the refraction index of switchable prisms 204A-H is set to be effectively the same as that of transparent layer 206. In this "oft" state, the optical behavior of lenticular array 100 is as shown in FIG. 3. Switchable prisms 204A-H, having the same refraction index as transparent layer 206, are optically indistinguishable from transparent layer 206.

In an "on" state in which switchable prisms 204A-H have an optical effect, the refraction index of switchable prisms 204A-H is set to be significantly different from that of transparent layer 206. In one embodiment, the refraction index of switchable prisms 204A-H in this "on" state is set to be the same as that of lenticles 202A-D. In this "on" state, switchable prisms 204A-H, being optically distinguishable from transparent layer 206, optically combine with lenticles 202A-D to affect their optical behavior.

Figure 2:
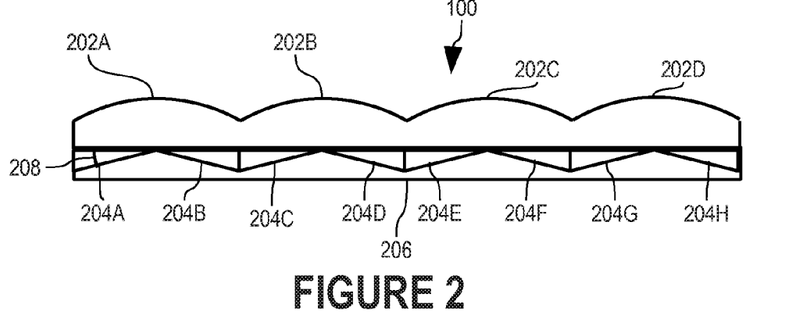
FIG. 2 is a plan view of a lenticular array of the autostereoscopic display of FIG. 1 in greater detail.
Figure 4:
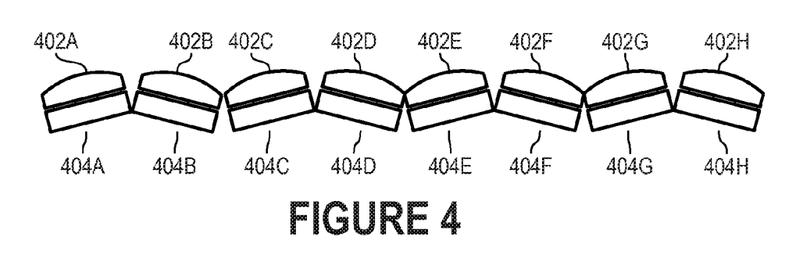

FIG. 4 shows a lenticular array that is optically equivalent to that of lenticular array 100 in the on state. For example, lenticle 202A (FIG. 2) combined with switchable prisms 204A-B are optically equivalent to lenticle 402A (FIG. 4) combined with element 404A and lenticle 40213 combined with element 404B. For thin lenses, lenticles 402A-H combined with elements 404A-H are optically equivalent to lenticles 502A-H (FIG. 5) combined with elements 504A-H. While lenticular array 100 is still physically configured as shown in FIG. 2, lenticular array 100 in this "on" state is optically equivalent to the state shown in FIG. 5.

Since lenticles 502A-H combined with elements 504A-H represent the effective optical behavior of lenticular array 100 in this "on" state, lenticles 502A-H are referred to herein as virtual lenticles of lenticular array 100. In other words, virtual lenticles of lenticular array 100 are lenticles that are optically equivalent to lenticular array 100 in a given state. Thus, lenticular array 100 is switchable between at least two states that have virtual lenticles of different optical behavior.

Lenticles 502A-H have half the width of lenticles 202A-D. Thus, by electronically controlling the refraction index of switchable prisms 204A-H, lenticular array 100 can be switched between a state in which lenticular array 100 behaves optically as if lenticles 202A-D have their physical dimensions and a state in which lenticular array 100 behaves optically as if lenticles 202A-D are twice as many in number and have half their physical width.

Figure 6:
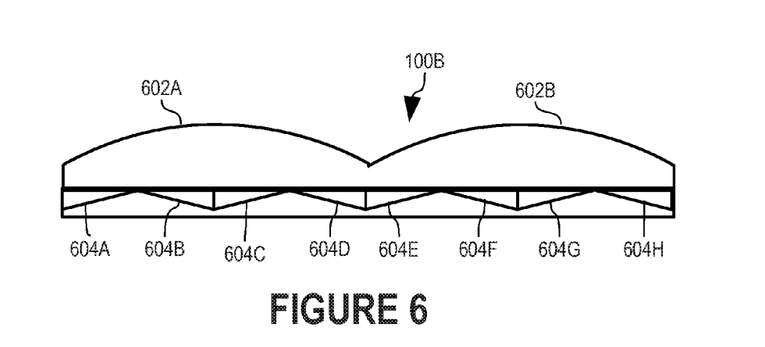
FIGS. 6 and 7 are plan views of an alternative lenticular array, illustrating how the alternative lenticular array is switchable between two alternative configurations in accordance with the present invention.
Figure 7:
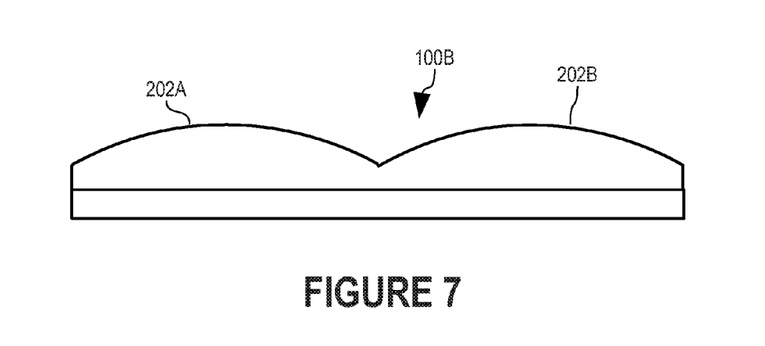

The electrical division of lenticles is not limited to halving of lenticles. Lenticular array 100B (FIG. 6) includes lenticles 602A-B, each of which is positioned in front of four (4) switchable prisms, i.e., switchable prisms 604A-D and 604E-H, respectively. When switchable prisms 604A-H are in the "off" state described above, lenticular array 100B optically behaves as shown in FIG. 7.

When switchable prisms 604A-H are in the "on" state described above, lenticular array 100B optically behaves as shown in FIG. 5. In particular, lenticle 602A (FIG. 6) combines with switchable prisms 604A-D to optically behave as illustrated by lenticles 402A-D (FIG. 4) combined with elements 404A-D. As described above, for thin lenses, lenticles 402A-D (FIG. 4) combined with elements 404A-D are optically equivalent to lenticles 502A-D (FIG. 5) combined with elements 504A-D.

It should be appreciated that the number of virtual lenticles into which a lenticle can be divided can be other than the embodiments described herein in which lenticles are divided into two (2) and four (4) virtual lenticles. For example, lenticles can be divided into three, five, or more virtual pixels. In addition, while lenticles are described herein as being divided into virtual lenticles of equal width, the division of lenticles can be into virtual lenticles of varying widths. What is important is that, in the "on" state, each switchable prisms deflects light through the lenticle at an angle substantially different from angles of deflection of light through adjacent portions of the lenticle.

Figure 13:
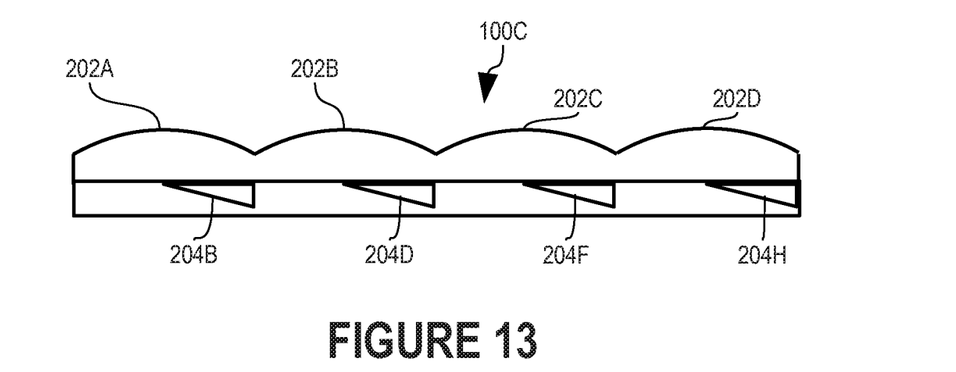
FIGS. 13 are 14 are each a plan view of an alternative lenticular array.
Figure 14:
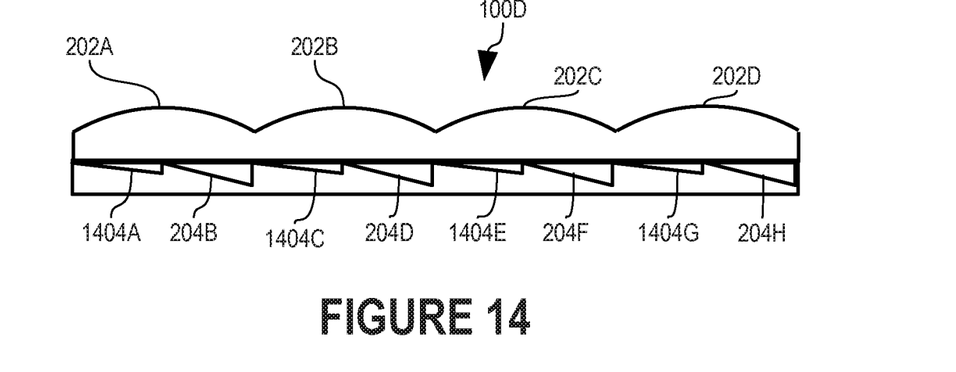

While switchable prisms are shown in the Figures to be arranged in pairs of reversed but otherwise identical configurations, it should be appreciated that lenticles such as lenticles 202A-D can be divided so long as adjacent switchable prisms deflect light passing through the lenticles at different angles. For example, switchable prisms 204A, 204C, 204E, and 204G can be omitted completely as shown by lentic lenticles ular array 100C (FIG. 13) and, with the exception of a small net deflection of lenticular array 100C, function as described above with respect to FIGS. 2-5. Similarly, lenticular array 100D (FIG. 14) replaces switchable prisms 204A, 204C, 204E, and 204G with switchable prisms 1404A, 1404C, 1404E, and 1404G that, in the "on" state, reflect light at a significantly different angle than do switchable prisms 204B, 204D, 204F, and 204H. Switchable prisms 1404A, 1404C, 1404E, and 1404G can differ from switchable prisms 204B, 204D, 204F, and 204H in physical dimension and/or in refraction index in the "on" state to achieve the significant difference in angle of deflection of light.

Figure 8:
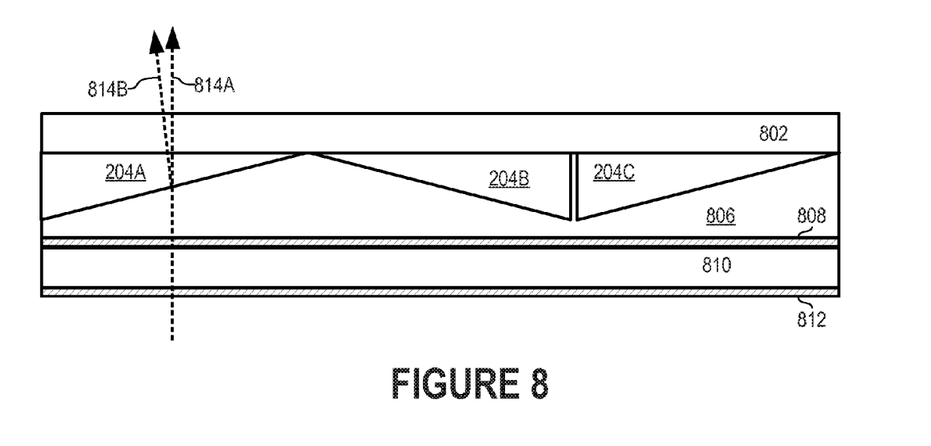
FIG. 8 is a plan view of switchable prisms of the lenticular arrays of FIGS. 2-7 in greater detail.

Switchable prisms 204A-C are shown in greater detail in FIG. 8 in cross-section view from above. Unless otherwise noted herein, the following description of switchable prisms 204A-C in conjunction with FIG. 8 is equally applicable to switchable prisms 204D-H, 602A-H, 1404A, 1404C, 1404E, and 1404G. Each of switchable prisms 204A-C is a triangular column of birefringent material such as liquid crystal. Switchable prisms 204A-C are positioned between a layer 802 of transparent plastic or glass and a grooved layer 806 of transparent plastic or glass into which triangular grooves are made to provide space for the triangular columns of switchable prisms 204A-C.

Behind layer 806 is a switch layer 810 of liquid crystal between electrode layers 808 and 812. By selectively applying a charge to electrode layers 808 and 812, polarization of light passing through switch layer 810 can be switched, e.g., between parallel and perpendicular orientations relative to the birefringent material of switchable prisms 204A-C.

The birefringent material, its orientation set at manufacture, and the size and shape of switchable prisms 204A-C are selected to provide one amount of light deflection with one polarization orientation of switch layer 810 and a different amount of deflection with the other polarization orientation of switch layer 810. In effect, the birefringent material in the triangular columns of switchable prisms 204A-C is formed into prisms whose degree of light deflection vary according to the state of switch layer 810.

In this illustrative embodiment, the birefringent material is selected to have one refraction index substantially equal to the refraction index of the transparent material of layers 802 and 806, and therefore provides no deflection of light as shown by arrow 814A, for one polarization orientation of switch layer 810. In effect, switchable prisms 204A-C disappear into layers 802 and 806, and switchable prisms 204A-C and layers 802 and 806 appear to be a single, flat layer of transparent material. For the other polarization orientation of switch layer 810, the birefringent material of switchable prisms 204A-C, its orientation set at manufacture, is selected to have a refraction index substantially equivalent to that of lenticles 202A-D in the embodiment of FIG. 2 or that of lenticles 602A-B in the embodiment of FIG. 6. In this alternative state of switchable prisms 204A-C (FIG. 8), switchable prisms 204A-C deflect light passing through transparent layers 802 and 806 as shown by arrow 814B.

Figure 9:
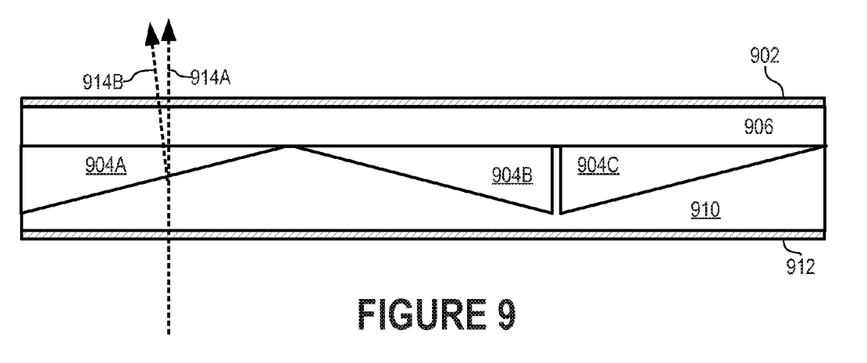
FIG. 9 is a plan view of alternative switchable prisms of the lenticular arrays of FIGS. 2-7 in greater detail.

FIG. 9 shows switchable prisms 904A-C, which are an alternative embodiment of switchable prisms 204A-C (FIG. 8). Unless otherwise noted herein, the following description of switchable prisms 904A-C is equally applicable to an alternative embodiment of switchable prisms 204A-H, 602A-H, 1404A, 1404C, 1404E, and 1404G. Switchable prisms 904A-C are triangular columns of a material whose refraction index is controllable, e.g., by an electrical field. An example of such a material is liquid crystal. Switchable prisms 904A-C are positioned between a layer 906 of transparent plastic or glass and a grooved layer 910 of transparent plastic or glass into which triangular grooves are made to provide space for the triangular columns of switchable prisms 904A-C.

In front of layer 906 is an electrode layer 902. Behind layer 910 is an electrode layer 912. By selectively applying a charge to electrode layers 902 and 912, the refraction index of the material in switchable prisms 904A-C can be varied.

The material within switchable prisms 904A-C, its orientation set at manufacture, and the size and shape of switchable prisms 904A-C are selected to provide desired refraction indices for the two states of switchable prisms 904A-C in response to electrical fields that can be produced across electrode layers 902 and 912. In effect, the material in switchable prisms 904A-C is formed into prisms whose degree of light deflection vary according to the electrical field between electrode layers 902 and 912.

Figure 1:
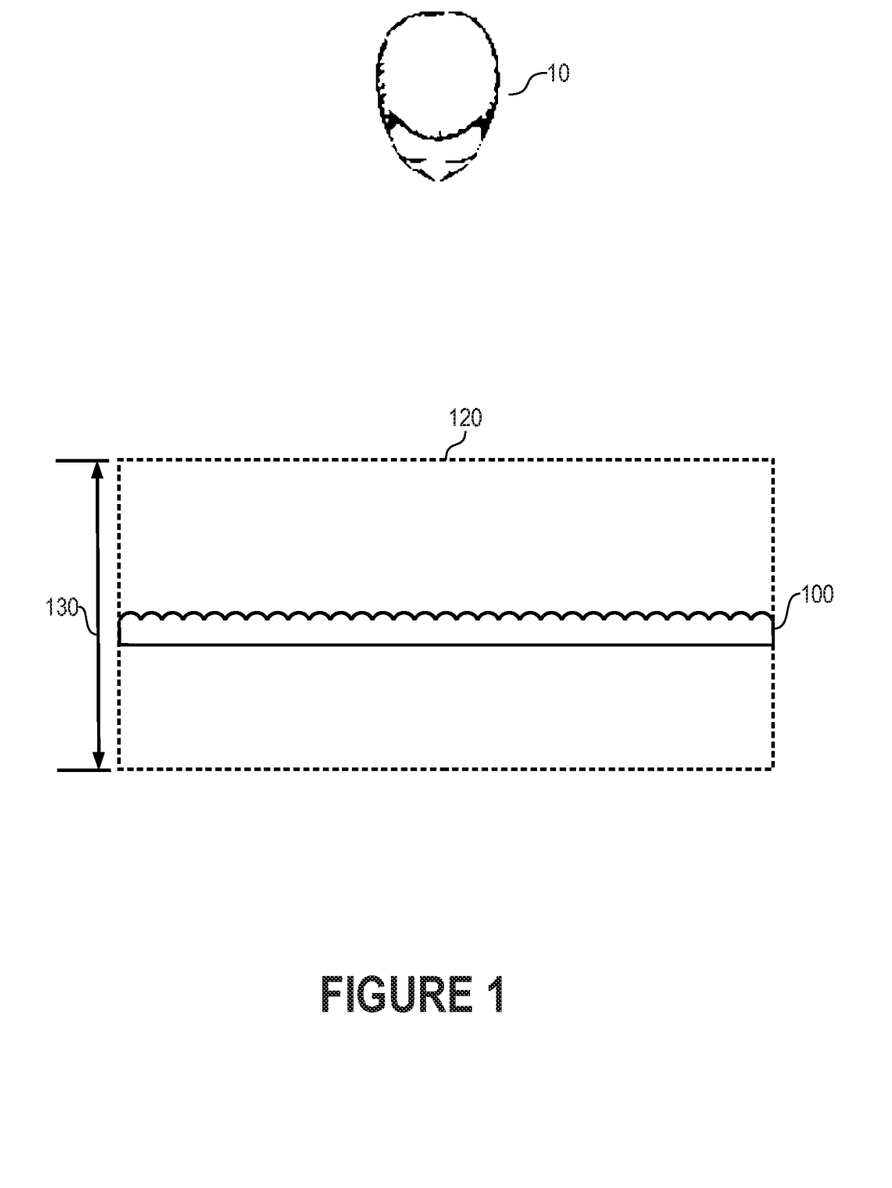
FIG. 1 is a plan view of a viewer and an autostereoscopic display in accordance with the present invention.
Figure 10:
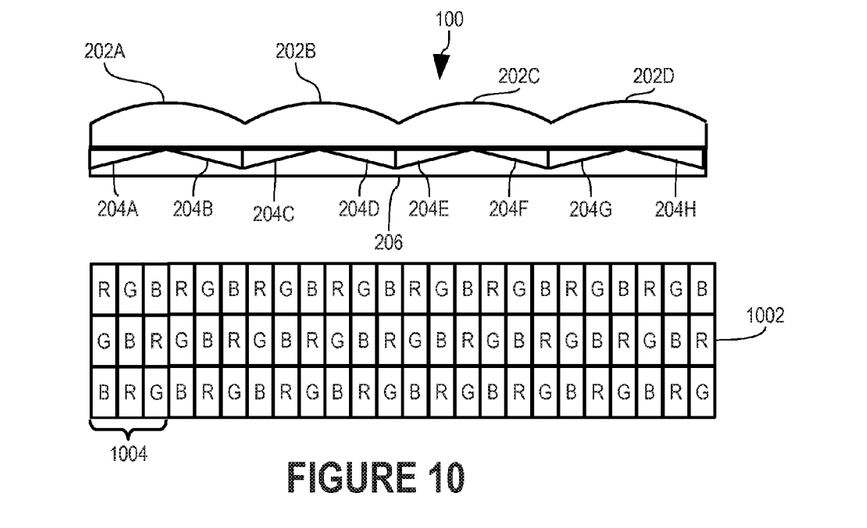
FIG. 10 is a plan view of the lenticular array of FIGS. 2-5 and a front view of a pixel array positioned behind the lenticular array to illustrate two distinct modes of operation in accordance with the present invention.

FIG. 10 shows lenticular array 100 of FIG. 2 positioned in front of a pixel array 1002 in which sub-pixels are arranged in a mosaic arrangement as shown. For clarity of explanation, lenticular array 100 is shown in cross-section view from above and pixel array 1002 is shown in a front view as facing human viewer 10 (FIG. 1). Lenticular array 100 and pixel array 1002 are switchable between an autostereoscopic three-dimensional display and a two-dimensional display with full resolution.

In this illustrative embodiment, pixel array 1002 is part of a 1080p video display having a native resolution of 1920×1080. Each of lenticles 202A-D is positioned in front of six (6) sub-pixel columns, having 960 lenticles in lenticular array 100.

Figure 11:
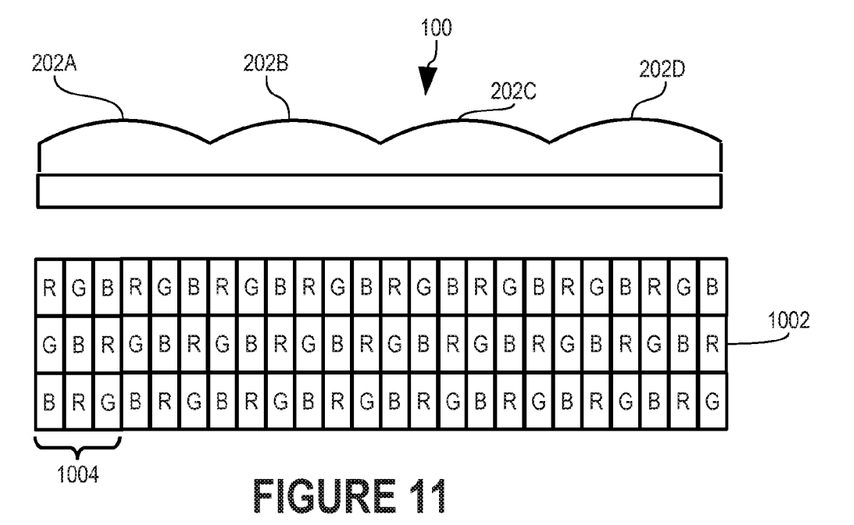
FIG. 11 is a plan view of the lenticular array of FIG. 10 in the state illustrated by FIG. 3 and a front view of the pixel array of FIG. 10.

In the 3D mode of operation, lenticular array 100 is in the "off" state shown in FIGS. 3 and 11. Furthermore, lenticular array 100 (FIG. 11) and pixel array 1002 maximize horizontal resolution at the expense of vertical resolution. One of the advantages of the mosaic arrangement of sub-pixels of pixel array 1002 is that the sub-pixels of pixel array 1002 can be logically grouped to form pixels horizontally or vertically. Consider 3-by-3 sub-pixel matrix 1004. Each row of sub-pixels of matrix 1004 collectively represents a color of a pixel. However, by transposing matrix 1004, each column of sub-pixels of matrix 1004 collectively represents a color of a pixel. Such transposition of each 3-by-3 sub-pixel array can be accomplished by swapping sub-pixel values in the pixel data representing video content to be displayed.

As noted above, each of lenticles 202A-D is positioned in front of six (6) columns of sub-pixels of pixel array 1002. In ordinary grouping of sub-pixels, that's two columns of pixels. However, after sub-pixel matrix transposition, that's six (6) columns of pixels but the rows of pixels are reduced by a third. In effect, the 1920×1080 display is now a 5,760×360 display, and the 960 lenticles of lenticular array 100 group the 5,760 columns into six (6) views under each lenticle.

To further increase the number of views for autostereoscopic display, pixel array 1002 is time mulitplexed by a factor of four (4) in the manner described in Appendix A of U.S. Provisional Patent Application 61/696,718 and that description is incorporated herein by reference. Thus, each of the pixel columns behind lenticles 202A-D can present four (4) virtual pixels side-by-side in the area of a single sub-pixel column. As a result, behind each of lenticles 202A-D are 24 views, providing good quality autostereoscopic effect to human viewer 10 (FIG. 1). In effect, the 1920×1080 display is now a 23,040×360 display, and the 960 lenticles of lenticular array 100 group the 23,040 columns into 24 views under each lenticle. Since only one of the 24 views will appear to fill each of lenticles 202A-D completely when viewed by either eye of human viewer 10, the perception of human viewer 10 is a stereoscopic image with a resolution of 960×360.

Figure 12:
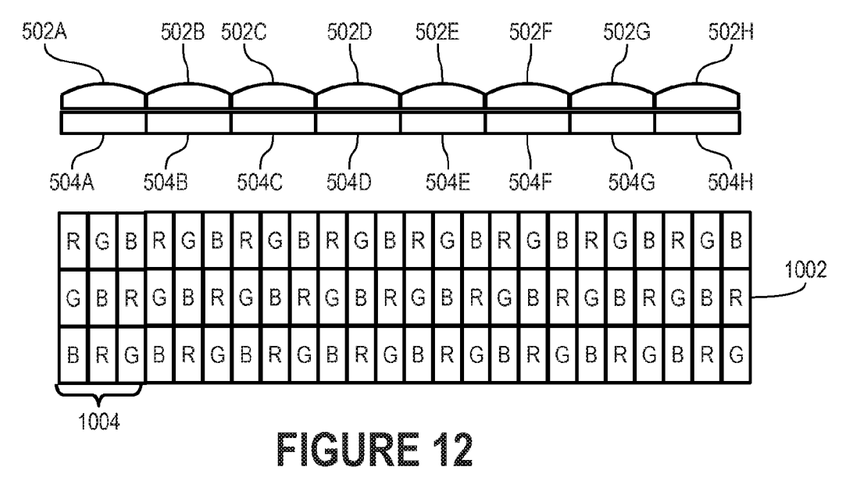
FIG. 12 is a plan view of the lenticular array of FIG. 10 in the state illustrated by FIG. 5 and a front view of the pixel array of FIG. 10.

In the 2D mode of operation, lenticular array 100 is in the "on" state shown in FIGS. 5 and 12. Accordingly, lenticles 502A-H (FIG. 12) are each in front of three (3) sub-pixel columns. Sub-pixel array 1004 is not transposed such that sub-pixel array 1004 represents a single column of three pixels. The time multiplexing of each sub-pixel column is disabled or nullified by making all four (4) time multiplexed pixels be the same. Without transposition of sub-pixel matrix 1004 and without time multiplexing, the result of the display remains the original 1920×1080.

The result is that each of lenticles 502A-H is positioned in front of a single column of pixels. Without transposition of sub-pixel matrix 1004 and without time multiplexing, the result of the display remains the original 1920×1080. In addition, lenticles 502A-H number 1,920, keeping the perceived resolution at 1920×1080.

Thus, lenticular array 100 and pixel array 1002 are switchable between a two-dimensional display at full 1080p resolution and a three-dimensional display with 24 views at a resolution of 960×360.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A lenticular array comprising:
    the lenticular array, in combination with a pixel array, being switchable between more than one viewing display, wherein a viewing display comprises a display having a predetermined viewing angle, predetermined depth of perception, and predetermined resolution;
    the lenticular array being switchable using:
    one or more lenticles; and
        for each of the lenticles:
            one or more physically stationary switchable optical elements that are electronically switchable between at least two states, wherein the one or more switchable optical elements are switchable between at least two states by electronically controlling the refraction index of the one or more switchable optical elements;
        wherein the one or more switchable optical elements are positioned in sufficient proximity to the lenticle to provide a combined optical effect with the lenticle;
        wherein a first of the states, having a first refraction index, of the switchable optical elements optically combine with at least a portion of the lenticles to be optically equivalent to a first set of virtual lenticles having physical characteristics equal to a first physical lenticular array configuration, wherein the first set of virtual lenticles comprises one viewing display; and
        further wherein a second of the states, having a second refraction index, of the switchable optical elements optically combine with at least a portion of the lenticles to be optically equivalent to a second set of virtual lenticles having physical characteristics equal to a second, different physical lenticular array configuration, wherein the second set of virtual lenticles comprises another viewing display;
    a view multiplexer, wherein the view multiplexer deflects light from a single physical pixel by a predetermined angle when a physical lenticular array configuration comprises at least a portion of a three-dimensional display.

2. The lenticular array of claim 1 wherein the one or more physically stationary switchable optical elements are switchable columnar prisms.

3. The lenticular array of claim 1 wherein the first physical configuration is the physical configuration of the lenticles.

4. The lenticular array of claim 3 wherein the second set of virtual lenticles are two or more smaller lenticles divided across the width of the lenticles.

5. The lenticular array of claim 3 wherein the second set of virtual lenticles are three or more smaller lenticles divided across the width of the lenticles.

6. The lenticular array of claim 1 wherein each of the one or more physically stationary switchable optical elements optically combines with a portion of the corresponding lenticle that is less than the entirety of the lenticle resulting in the portion of the corresponding lenticle being optically different from a remaining portion of the corresponding lenticle.

7. The lenticular array of claim 1, wherein the first physical configuration is one of: a three-dimensional display and a two-dimensional display.

8. The lenticular array of claim 1, wherein the second physical configuration is one of: a three-dimensional display and a two-dimensional display.

9. The lenticular array of claim 1, wherein the one or more physically stationary switchable optical elements are electronically switchable between at least three states;
    wherein a third of the states, having a third refraction index, of the switchable optical elements optically combines with the lenticles to be optically equivalent to a third set of virtual lenticles having physical characteristics equal to a third physical lenticular array configuration.

* * * * *